United States Patent [19]

Koch

[11] 4,037,677
[45] July 26, 1977

[54] COMBINED STEERING AND BRAKING MEANS FOR CRAWLER TRACTOR

[75] Inventor: George Paul Koch, Springfield, Ill.

[73] Assignee: Fiat-Allis Construction Machinery, Inc., Deerfield, Ill.

[21] Appl. No.: 640,767

[22] Filed: Dec. 15, 1975

[51] Int. Cl.² ............................................. B62D 11/08
[52] U.S. Cl. ................................... 180/6.7; 192/13 R
[58] Field of Search ........................ 180/6.7, 6.66, 6.2; 192/4 C, 4 A, 13 R

[56] References Cited

U.S. PATENT DOCUMENTS

| | | | |
|---|---|---|---|
| 3,324,963 | 6/1967 | Stroot et al. | 180/6.2 |
| 3,374,846 | 3/1968 | Massone | 180/6.7 |
| 3,386,523 | 6/1968 | Ruhl | 180/6.7 X |
| 3,460,645 | 8/1969 | Brown | 180/6.7 |
| 3,841,450 | 10/1974 | Drone | 192/4 C |
| 3,907,052 | 9/1975 | Shaw | 180/6.7 |
| 3,917,013 | 11/1975 | Orr | 180/6.7 |

*Primary Examiner*—Philip Goodman
*Assistant Examiner*—John A. Pekar
*Attorney, Agent, or Firm*—Thomas F. Kirby; Robert A. Brown

[57] ABSTRACT

A crawler tractor has an engine-driven fluid power shifted transmission for supplying motive power to left and right crawler tracks through spring-applied fluid-released left and right steering clutches and also has spring-applied fluid-released brake actuators for the track brakes. A hydraulic control system for steering and braking the tractor includes a combined steering and braking valve having a pair of lever operated valve spools, a shuttle valve, and a supplemental brake control valve operated by a single brake pedal. The combined steering and braking valve, which includes a flow divider, directs fluid from a pump to the brake actuators to maintain the brakes released when the valve spools are in neutral. When a lever operated valve spool is moved from neutral to some other position, the combined steering and braking valve directs fluid to disengage a clutch and causes the brake for the associated track to be applied. The combined steering and braking valve operates to regulate fluid pressure in the system and also operates to ensure that sufficient fluid pressure is available for clutch operation regardless of brake actuator demands. The shuttle valve is connected to the brake actuators and is responsive to the supplemental brake valve to apply either or both brakes when the supplemental brake valve is actuated either by the brake pedal or in response to a drop of fluid pressure in the power shift transmission.

4 Claims, 8 Drawing Figures

COMBINED STEERING AND BRAKING MEANS FOR CRAWLER TRACTOR

BACKGROUND OF THE INVENTION

1. Field of Use

This invention relates generally to combined steering and braking means for a crawler tractor or the like. In particular, it relates to a hydraulic control system having a combined steering and braking valve therein as well as other components.

2. Description of the Prior Art

In some prior art crawler tractors the hydraulic control system for the steering clutches and the track brakes includes a pair of manually operated steering clutch levers which actuate the valves for the steering clutches which transmit motive power from the tractor transmission to the tracks. A pair of brake pedals are used to selectively actuate a pair of brake cylinders which, in turn, control a pair of brakes for the tracks. Straight line vehicle movement is accomplished by engaging both clutches so as to drive both tracks in the same direction at the same speed. Steering is accomplished by operating one steering clutch lever so as to disengage its associated steering clutch and thereby slow down or stop its associated track while continuing to drive the other. Braking is accomplished during straight line vehicle movement by using both brake pedals and, during steering, by using the brake pedal for that track whose clutch is disengaged.

In such prior art tractors the steering clutches and the brake actuators are sometimes embodied in separate control systems which are supplied from separate hydraulic pumps. Aside from increased costs of such systems resulting from redundancy of components, such prior art systems often lack various automatic control functions which, if provided, would simplify and provide for safer tractor operation. The following patents disclose various types of prior art steering and braking control systems for vehicles: U.S. Pat. Nos. 3,437,184; 3,358,786; 3,386,523; 3,351,149; and 2,375,959.

SUMMARY OF THE INVENTION

A crawler tractor has an engine-driven fluid power shifted transmission for supplying motive power to left and right crawler tracks through spring-applied fluid-released left and right steering clutches and also has spring-applied fluid-released brake actuators for the track brakes. A hydraulic control system for steering and braking the tractor includes a combined steering and braking valve having a pair of lever operated valve spools, a shuttle valve, and a supplemental brake control valve operated by a single brake pedal. The combined steering and braking valve, which includes a flow divider, directs fluid from a pump to the brake actuators to maintain the brakes released when the valve spools are in neutral. When a lever operated valve spool is moved from neutral to some other position, the combined steering and braking valve directs fluid to disengage a clutch and causes the brake for the associated track to be applied. The combined steering and braking valve operates to regulate fluid pressure in the system and also operates to ensure that sufficient fluid pressure is available for clutch operation regardless of brake actuator demands. The shuttle valve is connected to the brake actuators and is responsive to the supplemental brake valve to apply either or both brakes when the supplemental brake valve is actuated either by the brake pedal or in response to a drop of fluid pressure in the power shift transmission. If both levers are in neutral and transmission fluid pressure drops below a predetermined value, as during reverse shifting to change direction of tractor travel, the supplemental valve effects automatic spring application of both brakes.

A control system having combined steering and braking valve in accordance with the invention require fewer duplicate components than prior art systems, is easier to operate and more reliable in operation. The system provides for a single brake pedal usable for steering and braking. The system employs fail-safe spring-applied brakes, requires only one pump for supplying the steering clutches and brake actuators, and enables automatic braking when the steering levers are in neutral and transmission fluid pressure drops, as during tractor direction reversal. The system employs an improved as yet relatively uncomplicated pedal operated supplemental brake valve to enable selective as well as automatic braking. Other objects and advantages will hereinafter appear.

DRAWINGS

DESCRIPTION OF A PREFERRED EMBODIMENT

Figure 1:
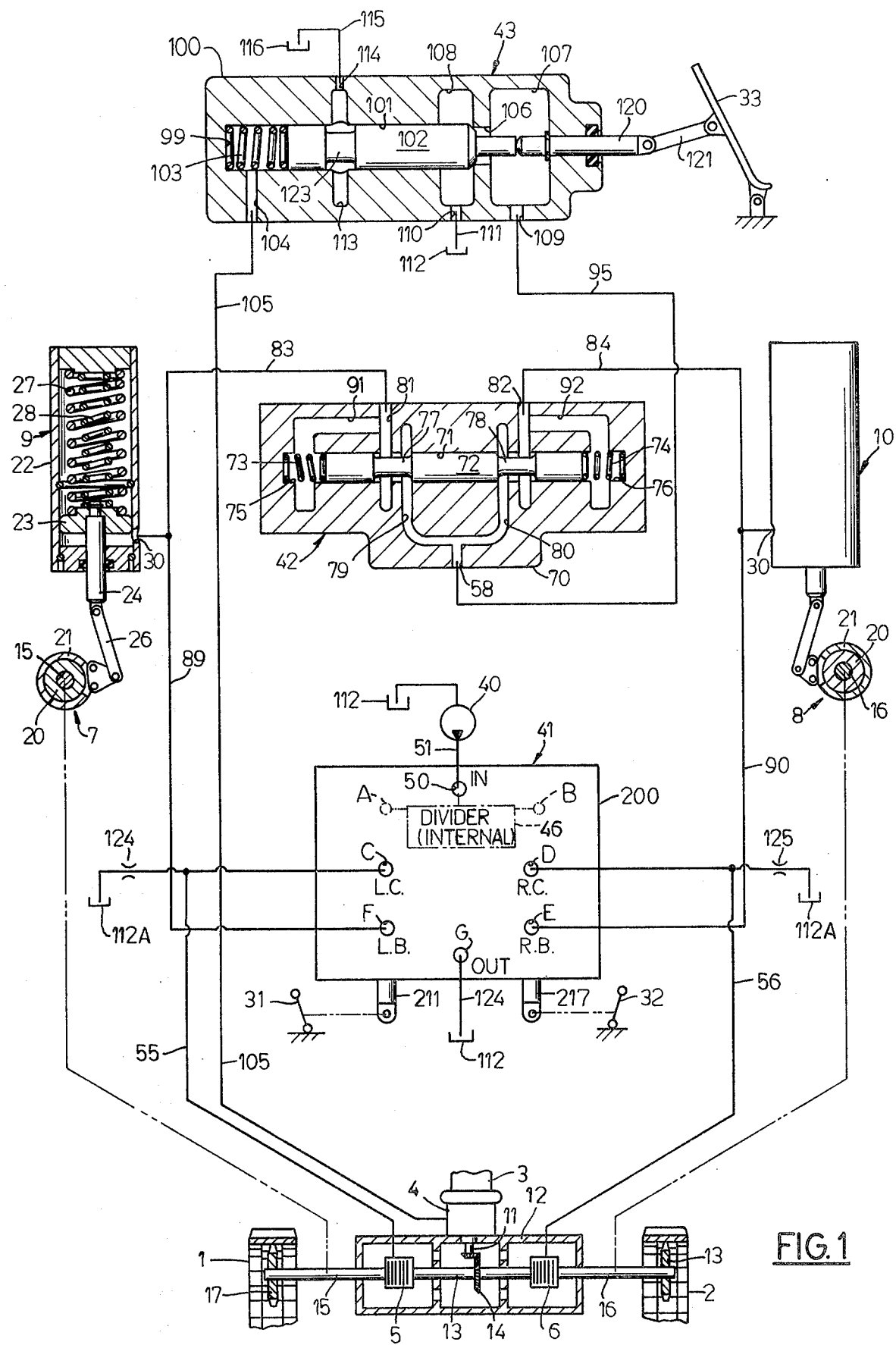
FIG. 1 is a schematic diagram of a control system in accordance with the invention.
Figure 2:
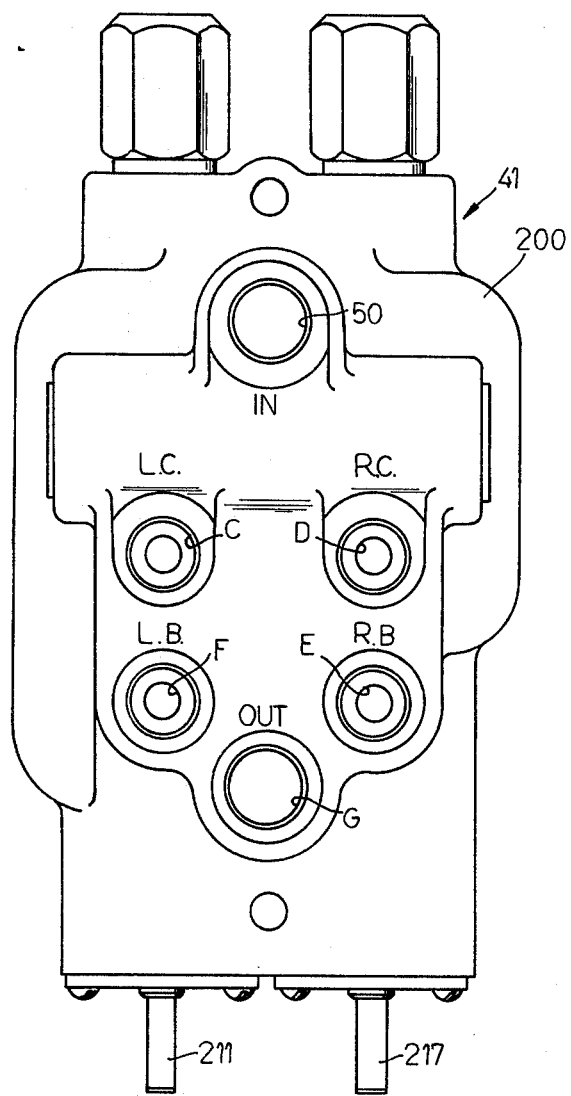
FIG. 2 is a top elevation view of a combined steering-brake valve shown in FIG. 1.
Figure 3:
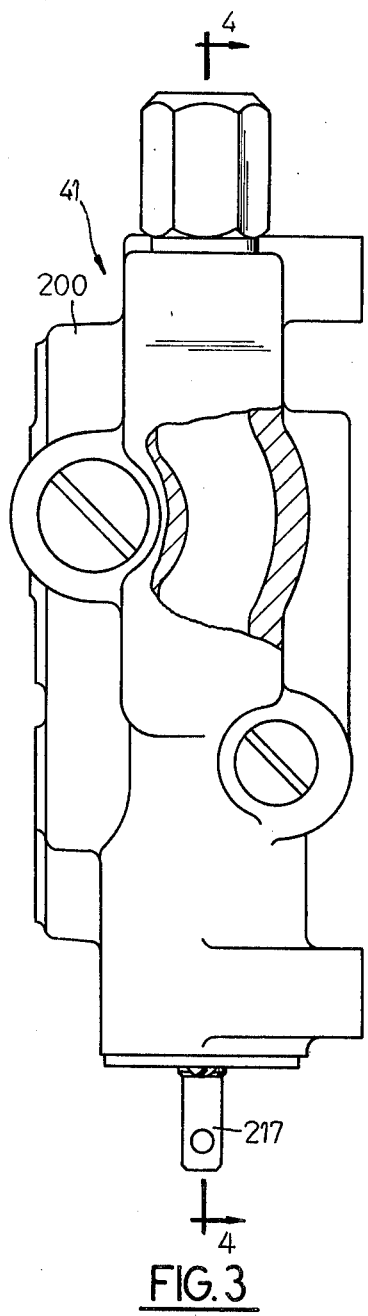
FIG. 3 is a side elevation view of the valve of FIG. 2.
Figure 6:
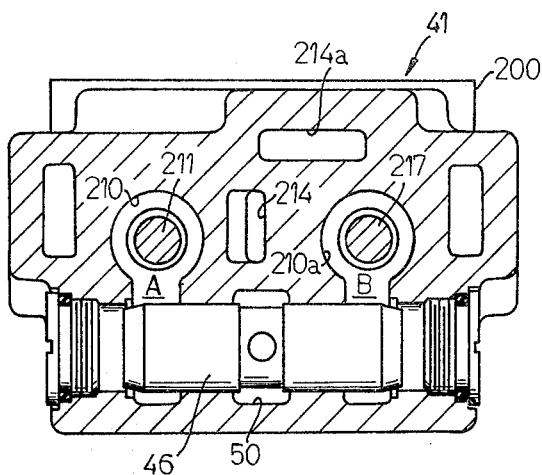
FIG. 6 is a cross section view of the valve taken on line 6—6 of FIG. 4.
Figure 7:
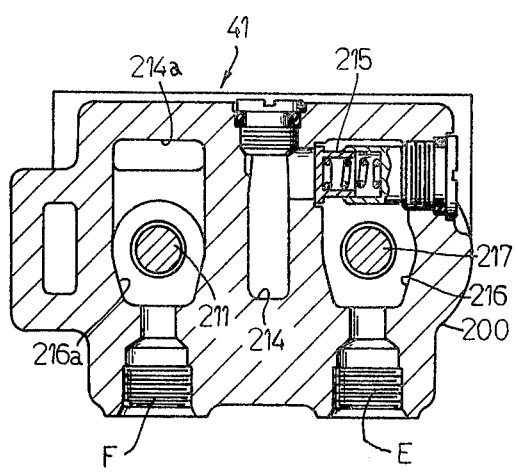
FIG. 7 is a cross section view of the valve taken on line 7—7 of FIG. 4.

Referring to FIG. 1, a crawler tractor has left and right crawler tracks 1 and 2, respectively, on opposite lateral sides thereof, an engine 3 for driving a transmission 4 to supply motive power to the tracks through conventional spring-applied fluid-released left and right steering clutches 5 and 6, and conventional spring-applied fluid-released left and right brakes 7 and 8, respectively, which are actuated by left and right brake actuators 9 and 10, respectively. The tractor also comprises manually operable left and right steering clutch and brake control levers 31 and 32 and a single brake pedal 33.

Transmission 4 is a power shift transmission for driving the tractor and has an output shaft 11 which extends into a housing 12 to drive a main shaft 13 through bevel gears 14. Main shaft 13 is connectable through the clutches 5, 6 when the latter are engaged to drive the left and right final drive shafts 15 and 16, respectively, to which track drive sprockets 17 and 18, respectively, are affixed.

Each brake 7, 8 comprises a brake drum 20 for the final drive shaft 15, 16 and a brake band 21 engageable with the brake drum. Each brake actuator 9, 10 comprises a housing 22 having a piston 23 therein for moving a piston rod 24 attached thereto which extends from the housing. Each housing 22 is rigidly secured to the tractor frame by means not shown. Each piston rod 24 is connected by a linkage 26 to an associated brake band 21. Each brake actuator 9, 10 comprises biasing spring means in the form of a pair of balanced compression springs 27 and 28 within its housing 22 for biasing the piston 23 in one direction to a position toward one end of the housing wherein brake band 21 fully engages its brake drum 20 and the brake 7, 8 is applied. Each housing 22 further comprises a fluid inlet port 30 for admitting fluid between the piston 23 and the said one end of the housing to effect piston movement in the opposite direction to release the brake 7, 8. The actuators 9 and 10 are mechanically connected to the brakes 7 and 8, respectively, and are spring biased to effect engagement of the brakes when the fluid pressure in the actuators 9 and 10, respectively, drops below a predetermined value.

The control system for steering and braking includes a single engine-driven pump 40 for supplying fluid to operate the steering clutches 5, 6 and the brake actuators 9, 10; a combined steering and braking valve 41 responsive to actuation of the levers 31, 32 to supply fluid to release the steering clutches 5, 6 and to release the brakes 7, 8; a shuttle valve 42 responsive to operation of the steering clutches 5, 6 to cause the brake actuators 9, 10 to effect brake application, and a supplemental brake control valve 43 operated by a pedal 33 and also responsive to transmission fluid pressure.

Generally speaking, the control system operates in such a manner that actuation of either lever 31, 32 effects fluid release of its associated steering clutch 5, 6 and application of the appropriate brake 7, 8. Operation of the single brake pedal 33 will also effect spring application of the brake 7, 8 for that track 1, 2 whose clutch 5, 6 is released. If both levers 31, 32 are in neutral and transmission fluid pressure drops below a predetermined value, as during reverse shifting to change direction of tractor travel, both brakes 7, 8 are automatically spring-applied. Functions for both situations occur without loss of fluid pressure necessary for control of the steering clutches 5, 6 because of a pressure regulating sequence in valve 41. If both levers 31, 32 are in neutral with both steering clutches 5, 6 engaged, operation of the single brake pedal 33 will then effect spring application of both brakes 7, 8 such as may be desirable during down hill coast.

Valve 41, which is understood to have a flow divider 46 therein, has a fluid inlet port 50 connected to pump 40 by a fluid line 51, an outlet port G connected to a reservoir 112 by a line 124, and also has clutch supply ports C and D which are connected by fluid lines 55 and 56, respectively, to the clutches 5 and 6, respectively. Valve 41 also has ports F and E for supplying the fluid ports 30 of the brake actuators 9 and 10, respectively, through lines 89 and 90, respectively. The lines 89 and 90 are connected by lines 83 and 84, respectively, to the ports 81 and 82, respectively, of shuttle valve 42. Valve 41 is provided with a housing 200 and with left and right valve spools 211 and 217, slideable in bores 201 and 202, respectively, which are connected for actuation by the levers 31 and 32, respectively. The spools 211 and 217 are normally biased in neutral position wherein they prevent fluid flow from pump 40 to the steering clutches 5 and 6 to maintain the clutches spring-engaged but permit flow to the brake actuators 9 and 10 to maintain the brakes 7 and 8 released. The spools are axially movable therefrom by the levers 31 and 32 to effect fluid flow from pump 40 to release the clutches 5 and 6, respectively, and to prevent fluid flow to the actuators 9 and 10 to apply the brakes 7 and 8, respectively. To ensure engagement of clutches 5 and 6 when valve spools 211 and 217 are in neutral position, bleed-down restrictor orifices 124 and 125 are provided to allow pressure fluid in lines 55 and 56 to escape to reservoir 112A. Valve 41 is hereinafter described in detail.

Figure 4:
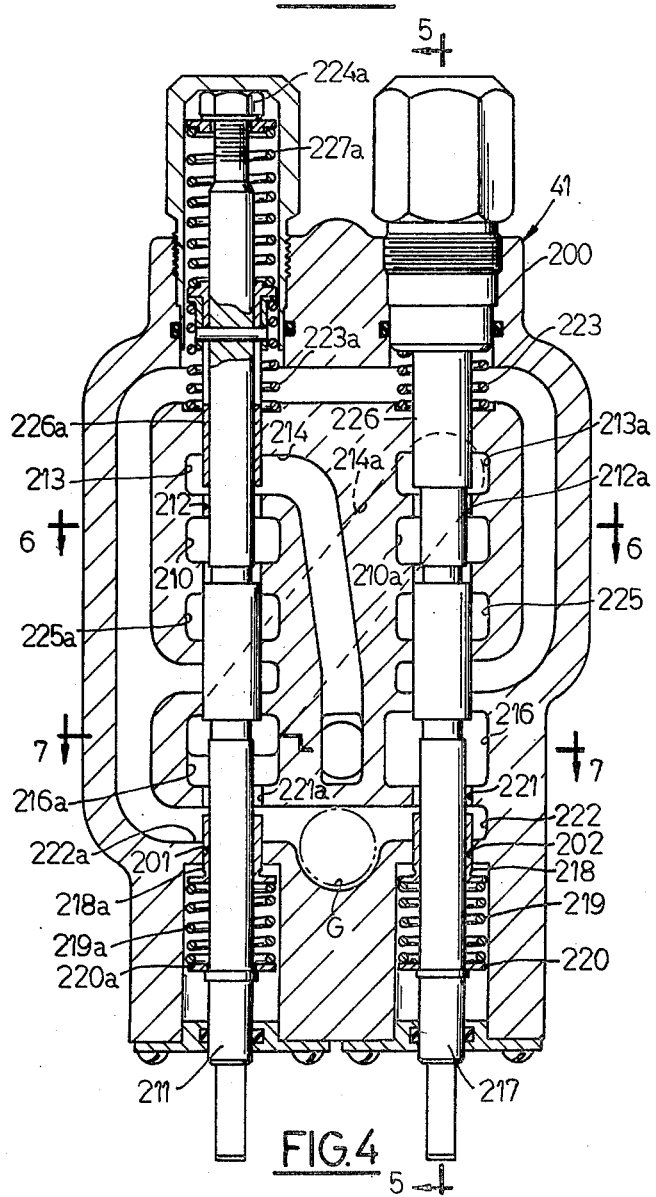
FIG. 4 is a cross section of the valve taken on line 4—4 of FIG. 3.
Figure 5:
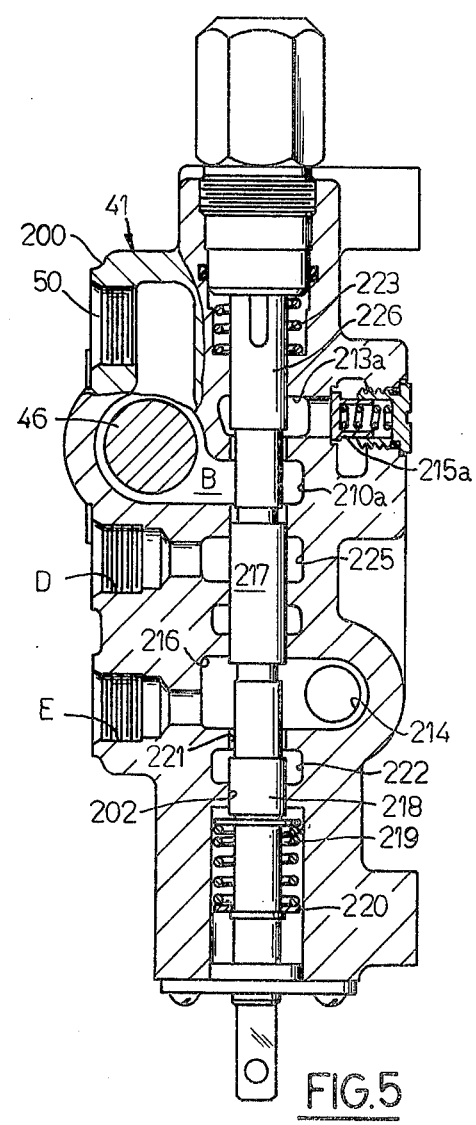
FIG. 5 is a cross section view of the valve taken on line 5—5 or FIG. 4.
Figure 8:
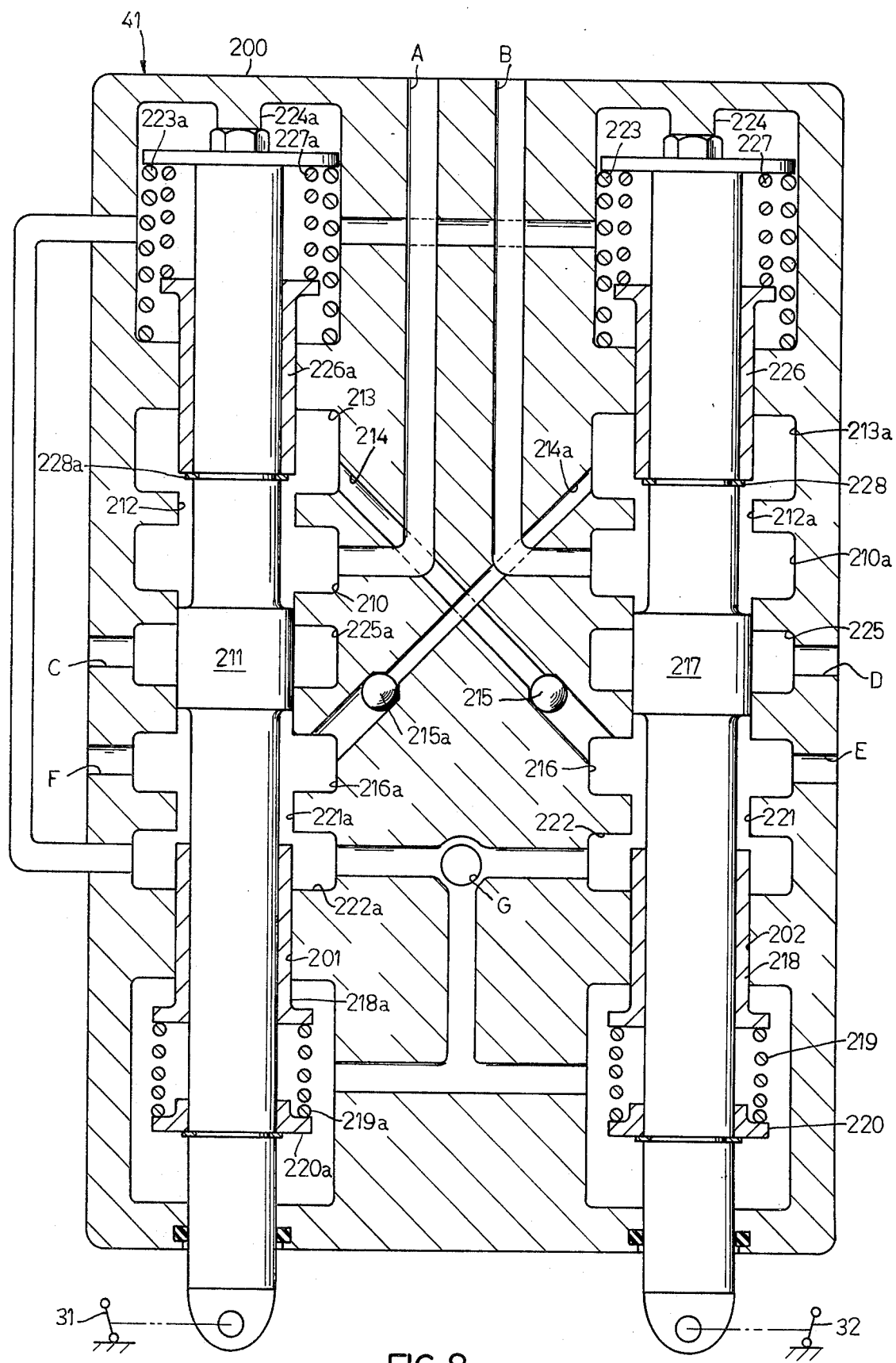
FIG. 8 is a schematic diagram of the steering-brake valve.

In addition to steering clutch and brake control, the valve 41 also provides pressure regulation sequence and pressure control valving. Referring to FIGS. 1, 4, and 8, valve 41 comprises a housing 200. Fluid from the flow divider 46 entering port A passes into a chamber 210 that is associated with spool 211. In the neutral position of the valve spool 211, an opening 212 is available for the fluid to enter from chamber 210 into another chamber 213, then through a passage 214 and a check valve 215 to a chamber 216 associated with the other valve spool 217. Fluid in chamber 216 is available at port E with pressure to apply against the spring 277 in the right hand brake cylinder 10 to release the right hand spring applied brake 8 (shown in FIG. 1). Fluid pressure is regulated by a sleeve 218 surrounding spool 217 and slideable within the spool bore 202 in the valve housing 200. A spring 219 reacting axially against a washer 220 on spool 217 forces sleeve 218 upward tending to close an annular passage 221 between chamber 216 and chamber 222. The combination of spring 219 force and the cross sectional area at the upper end of sleeve 218 tending to close passage 221 establishes the fluid pressure applied at port E to release the right hand brake 7. The reaction force axially applied downwardly on spool 217 by spring 219 is amply resisted by a spring 223 located at the upper end of spool 217 and biasing the spool upward against a stop 224. The fluid in chamber 222 is returned to tank through port G.

Similarly, fluid from the flow divider 46 entering port B progresses in like manner with relation to like components to provide pressure at port F for releasing the left hand brake 8.

In order to release (disengage) the normally spring-applied steering clutches 5, 6, either or both valve spools 211 and 217 are manually moved downwardly (in FIGS. 1, 2, 3, 4, 5, and 8) against the force of spring 223 of spool 217 and spring 223a of spool 211.

A vehicle turn to the right is accomplished by pulling on the right hand steering lever 32 to shift valve spool 217 away from stop 224 against the force of spring 223. Fluid pressure supplied by the flow divider 46 at port B from the hydraulic pump 40 passes through chamber 210a, to chamber 225, out port D to the right hand steering clutch 6 thereby releasing it.

Supplemental pressure regulation is provided by a sleeve 226 on spool 217 backed up by spring 227 tending to close annular passage 212a in much the same manner that sleeves 218 and 218a tend to close annular passages 221 and 221a when spools 217 and 211 are in their neutral positions. This arrangement provides pressure sequencing to assure that pressure is always available to release the steering clutch 6 regardless of the subsequent variable requirements for brake control. Specifically, pressure in lines 89, 90 may be depleted without similar depletion of fluid pressure that is available from pump 40 for control of steering clutches 5 and 6. The importance of this is evident during several operational maneuvers of the tractor, such as when manually applying one or both brakes 7 and 8 when accompanied by the release of one or both steering clutches 5 and 6.

Fluid pressure from the flow divider 46 supplied to port A, to chamber 210, through annular passage 212, chamber 213, passage 214, through check valve 215 and into chamber 216 is reduced as a result of spool 217 movement downward. This movement causes spring 219 to reduce the force on sleeve 218 thereby permitting fluid from chamber 216 to flow through annular passage 221 and chamber 222 through outlet port G to the tank 112 at progressively lower pressure in proportion to the spool travel. This action causes pressure in the right hand brake cylinder 10 to decay and allows the spring 27 in this cylinder 10 to apply the right hand brake 8.

A vehicle turn to the left is accomplished by pulling on the left hand steering lever 31 thereby moving valve spool 211 away from the stop 224a with the result that, in a like manner with relation to like components, pressure delivered from port C will release the left hand steering clutch 5 and pressure reduction at port F will automatically allow the spring to apply the left hand brake 7.

Check valves 215 and 215a are required to prevent pressure feedback (pressure loss) from the brake cylinders 9 and 10 when the spools 211 and 217 are starting to apply pressure to disengage the steering clutches 5 and 6.

The pedal actuated supplemental brake control valve 43 serves to enable selective application of either or both brakes 7 and 8 in response to depression of single pedal 33 and also serves to automatically apply the brakes 7 and 8 when the tractor transmission 4 is operating in neutral and fluid pressure in the transmission drops below some predetermined value. Valve 43 comprises a housing 100 having an axial bore 101 therein in which a valve spool 102 is slideably mounted. Spool 102 is biased toward the right (referring to FIG. 1) by a compression spring 103 in chamber 99 which acts in combination with transmission fluid pilot pressure supplied to a port 104 through a supply line 105 from tractor transmission 4. Rightward movement of spool 102 operates to close an annular fluid passage 106 in valve communicating between chambers 107 and 108 in valve 43. Chamber 107 has a port 109 by means of which it communicates through a fluid line 95 with port 58 in shuttle valve 42. Chamber 108 has a port 110 by means of which it communicates through a fluid line 111 to reservoir 112. Valve 43 comprises another passage 113 having a port 114 by means of which fluid leakage from line 105 that passes spool 102 may be returned through a line 115 to a reservoir 116 for the transmission fluid. Valve 43 also comprises an axially movable rod 120 which is connected by a linkage 121 to brake pedal 33 and has its innermost end in abutting engagement with the end of valve spool 102. Valve spool 102 is provided with a groove 123 which is in registry with the passage 113 in valve 43. When both control levers 31 and 32 are in neutral position, both brakes 7 and 8 will be applied if either (1) the single foot brake pedal 33 is depressed, or (2) the transmission 4 is shifted to neutral thereby reducing the pilot pressure in line 105. In either event pressure fluid in chamber 107 escapes at a lower pressure through passage 106 to chamber 108 and to reservoir 112. Chamber 107 communicates with port 58 in shuttle valve 42. Fluid pressure from transmission hydraulic circuit line 105 acts on piston or spool 102 to urge poppet valve passage 106 closed. Spring 103 serves to achieve a proper balance between the transmission pilot pressure acting on spool 102 and the brake control pressure in line 95 so that when transmission pilot pressure in transmission 4 and line 105 drops below a predetermined value, such as during a change in vehicle direction during shift, the poppet valve passage 106 is permitted to open and release the pressure in line 95 to reservoir 112 and in brake actuators 9 and 10, thus allowing the brake springs 27 and 28 to apply brakes 7 and 8.

Shuttle valve 42 comprises a housing 70 having a bore 71 therein in which a shuttle valve spool 72 is slideably mounted and normally maintained in centered position by compression type centering springs 73 and 74 located in pilot pressure chambers 75 and 76 in the bore and disposed between the spool ends and the ends of the housing. Valve spool 72 is provided with a pair of spaced apart grooves 77 and 78 which are aligned or register with fluid flow passages 79 and 80, respectively, when the spool is centered. The passages 79 and 80, each of which communicates with fluid inlet port 58, also communicate with the fluid ports 81 and 82, respectively, which are connected by fluid lines 83 and 84, respectively, to the ports 30 of the brake actuators 9 and 10. The pilot pressure chambers 75 and 76 of shuttle valve 42 are connected by passages 91 and 92, respectively, to the lines 83 and 84, respectively. When shuttle valve 42 is in neutral position, fluid from lines 83 and 84 is combined and directed through passages 79 and 80, respectively, to port 58. Chamber 107 in valve 43 communicates with a "Y" passage 79, 80 in shuttle valve 42 shown in FIG. 1. Lines 83 and 84 are branches of lines 89 and 90, respectively, leading from ports F and E, respectively, of valve 41 to the left hand and right hand brake cylinders 9 and 10, respectively, and communicate with the passages 79 and 80, respectively. Branch passages 91 and 92 from lines 83 and 84 are directed to the pilot chambers 75 and 76, respectively, of valve 42 and act on spool 72 so that it will move to the right or left in response to a difference in pressure in lines 83 and 84. This action is such as to isolate the one of these passages 91 or 92 with the highest pressure from the other passages 91 or 92 and from action resulting from the operation of supplemental brake control valve 43.

Valve 43 acting in conjunction with shuttle valve 42 then provides for supplemental control of the automatic operation of the brakes 7 and 8 in response to operation of the left and right steering levers 31 and 32 and also provides for automatic braking in neutral. The degree by which automatic braking is coordinated with steering control depends on the designed force and rate of springs 219 and 219a in valve 41.

Manual application of the brakes 7 and 8 is accomplished by depressing the single brake pedal 33 thereby moving valve spool 102 of valve 43 to the left in the drawing against spring 103. This allows fluid to pass through line 95 into chamber 107, through passage 106 at modulatingly controlled pressure, to chamber 108 and then to sump 112. Fluid in line 95 normally communicates with both brake actuator cylinders 9 and 10 by means of the dual passages 79 and 80 in shuttle valve 42.

If both control levers 31 and 32 are moved from neutral simultaneously, fluid pressure in both lines 83 and 84 acts on opposite ends of the shuttle valve spool 72. Equalization springs 73 and 74 at both ends of spool 72, along with the equal pilot fluid pressure in the chambers 75 and 76, retain the spool in a neutral position. This allows fluid in both brake actuators 9 and 10 to escape to sump 112 and results in application of both brakes 7 and 8.

If only one control lever 31 or 32 is moved from neutral, then the fluid pressure being used to release the one brake acts on one end of the shuttle valve spool 72 to shift it in a direction to block one of the passages 79 or 80 so that fluid from only one brake actuator 9 or 10 is allowed to escape to sump 112 to effect brake application.

I claim:

1. In a vehicle having a pair of ground engaging drive means and which is steered by selectively driving and braking said drive means:

an engine-driven fluid power shifted transmission;
a pair of spring applied fluid released steering clutches for transmitting motive power from said transmission to said ground engaging drive means;
a pair of spring applied fluid released brakes for said ground engaging drive means;
a pair of hydraulic actuators for operating said brakes;
a source of pressurized fluid;
combined steering and braking valve means connected to said source, to said clutches, and to said brake actuators and being selectively actuatable for controlling fluid flow from said source to said steering clutches to operate said clutches and to said brake actuators to operate said brakes;
a pair of movable control members operatively connected for selectively actuating said combined steering and braking valve means;
said combined steering and braking valve means being responsive to operation of said levers to effect automatic application of both brakes if both steering levers are simultaneously operated to disengage both clutches and to effect application of one brake for one track if one steering lever is operated to disengage one clutch for said one track;
supplemental brake control valve means;
a single movable brake member for selectively operating said supplemental brake control valve means; and
shuttle valve means operatively connected to said combined steering and braking valve means, to said brake actuators and to said supplemental brake control valve means and responsive to said supplemental brake control valve means for controlling fluid flow from said source to said brake actuators to provide for supplemental control of said brakes.

2. A vehicle according to claim 1 wherein said supplemental brake control valve means is also operatively connected to said transmission and is responsive to fluid pressure in said transmission to effect automatic application of both brakes when said fluid pressure in said transmission drops below a predetermined level, even though said brake pedal is not actuated.

3. A vehicle according to claim 1 wherein said combined steering and braking valve means includes means responsive to fluid pressure at said source to limit the fluid pressure supplied to said clutches and said hydraulic actuators to a predetermined level.

4. In a steering by driving vehicle: an engine driven fluid power shifted transmission, a pair of ground engaging drive means, and a control system for steering and braking said vehicle comprising:

a source of pressurized fluid;
a pair of spring-applied fluid pressure releasable steering clutches for drivingly connecting said transmission to said ground engaging drive means;
a pair of spring-applied fluid pressure releasable brakes for said ground engaging drive means;
a pair of brake actuators connected for actuation of said pair of brakes;
a combined steering and braking valve connected to said source, to said clutches and to said brake actuators and comprising a pair of valve spools in which each is selectively movable from neutral position to other positions for directing fluid from said source to operate said steering clutches and said brake actuators;
means for selectively moving said valve spools;
a single brake pedal;
a supplemental brake control valve actuatable by said single brake pedal; and
a shuttle valve operatively connected to said combined steering and braking valve, to said brake actuators, and to said supplemental brake control valve for controlling fluid flow to and from said brake actuators, said shuttle valve being responsive to the condition of said supplemental brake control valve, said shuttle valve being shiftable between neutral position and other positions;
said combined steering and braking valve being operable to reduce fluid pressure in both of said brake actuators when said shuttle valve is in neutral position for applying said pair of brakes even though said brake pedal is not actuated, said combined steering and braking valve being further operable to reduce fluid pressure in one of said brake actuators in response to movement of one of said valve spools when releasing one of said steering clutches for applying one of said brakes associated with said one clutch when said brake pedal is actuated, and said combined steering and braking valve being further operable in response to fluid source pressure for limiting fluid pressure supplied to said clutches and brake actuators to a predetermined maximum value;
said supplemental brake control being further operatively connected to said transmission and operable in response to a drop of fluid pressure in said transmission to reduce fluid pressure in both of said brake actuators when said shuttle valve is in neutral position for applying said pair of brakes even though said brake pedal is not actuated.

* * * * *